United States Patent Office 3,780,018
Patented Dec. 18, 1973

---

3,780,018
DERIVATIVES OF GENTAMICIN $C_1$
Masataka Konishi, Yokohama, and Hiroshi Tsukiura, Tokyo, Japan, assignors to Bristol-Myers Company, New York, N.Y.
No Drawing. Filed June 26, 1972, Ser. No. 266,170
Int. Cl. C07c 129/18
U.S. Cl. 260—210 AB                   13 Claims

ABSTRACT OF THE DISCLOSURE

Derivatives of gentamicin $C_1$ have been prepared which possess substantially improved antibacterial activity. An example of such an agent is 1-[L-(—)-γ-amino-α-hydroxybutyryl]gentamicin $C_1$ [IIIa, BB–K62].

BACKGROUND OF THE INVENTION (1) Field of the invention

This invention relates to semisynthetic 1- or 2'-substituted derivatives of gentamicin $C_1$, said compounds being prepared by acylating the 1 or 2'-amino-function of gentamicin $C_1$ with a γ-amino-α-hydroxybutyryl moiety.

(2) Description of the prior art (A) Gentamicin (gentamycin) and the fermentation thereof is the subject matter of U.S. Pat. Nos. 3,091,572 which issued May 28, 1963 and 3,136,704 which issued June 9, 1964. The patents describe the fermentation of gentamicin, complexes from *Micromonospora purpurea*, NNRL 2953 and *Micromonospora echinospora*, NNRL 2985. Variants thereof have also been deposited in the stock culture collection of the United States Department of Agriculture, Northern Utilization Research and Development Division, Peoria, Ill. as *M. echinospora* var. *ferruginea*, NNRL 2995 and *M. echinospora* var. *pallida*, NNRL 2996.

(B) Gentamicin is further described in the Merck Index, 8th Edition, p. 485. The two major components, gentamicin $C_1$ and $C_2$ are described therein.

SUMMARY OF THE INVENTION

The compound having the formula

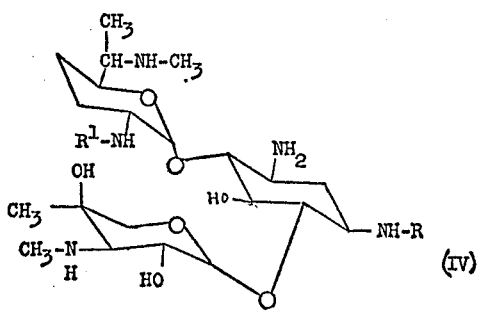

in which either $R^1$ or R is L-(—)-γ-amino-α-hydroxybutyryl and the other is hydrogen; or a nontoxic pharmaceutically acceptable acid addition salt thereof is a valuable antibacterial agent.

This nivention relates to semi-synthetic derivatives of gentamicin C, said compounds being known as 1 or 2'- [L-(—)-γ-amino-α-hydroxybutyryl]gentamicin $C_1$ and having the formula

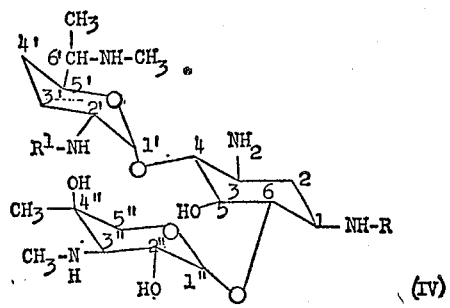

in which either $R^1$ or R is L-(—)-γ-amino-α-hydroxybutyryl and the other is hydrogen, or a nontoxic pharmaceutically acceptable acid addition salt thereof.

For the purpose of this disclosure, the term "nontoxic pharmaceutically acceptable acid addition salt" shall mean a mono, di-, tri-, tetra, or penta salt formed by the interaction of 1 molecule of compound IV with 1–5 moles of a nontoxic, pharmaceutically acceptable acid. Included among these acids are acetic, hydrochloric, sulfuric, maleic, phosphoric, nitric, hydrobromic ascorbic, malic and citric acid, and those other acids commonly used to make salts of amine containing pharmaceuticals.

Gentamicin C is fermented as a complex of three closely related components designated "$C_1$," "$C_2$" and "$C_{1a}$." For the purpose of this application we are only concerned with gentamicin $C_1$, the starting material of the compounds of the instant invention, which has the formula

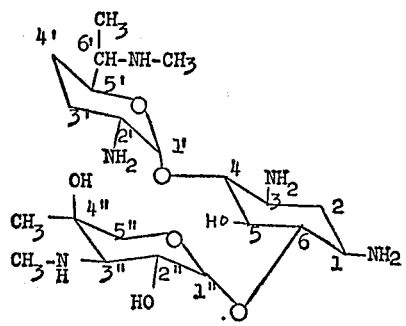

The compounds of the present invention are prepared by the following diagramatic scheme:

(A) Gentamicin $C_1$
(I)

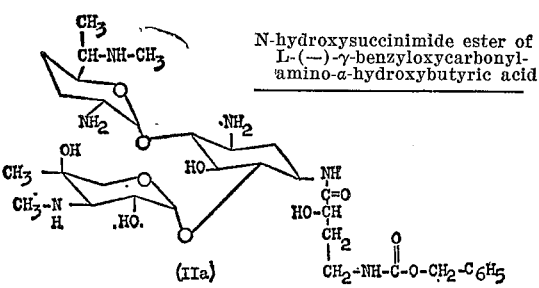

N-hydroxysuccinimide ester of L-(—)-γ-benzyloxycarbonyl-amino-α-hydroxybutyric acid and/or

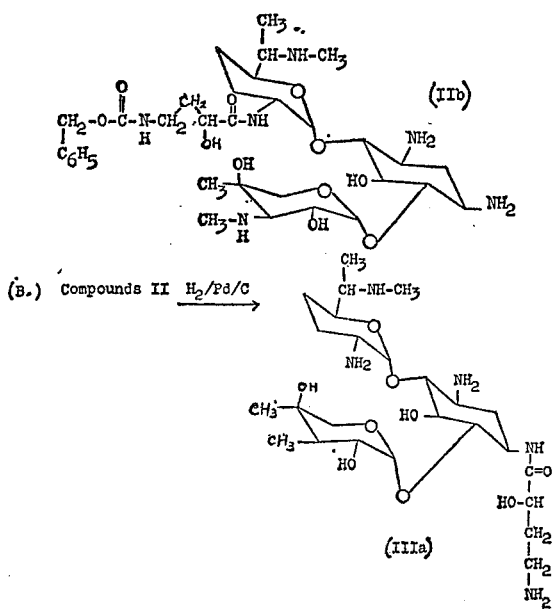

and

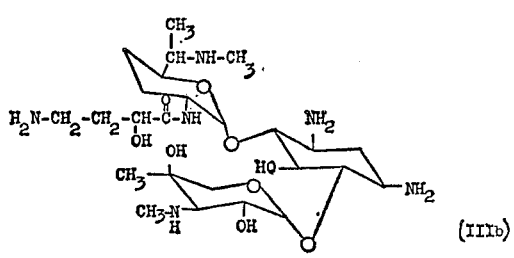

A preferred embodiment of he present invention is the compound having the formula

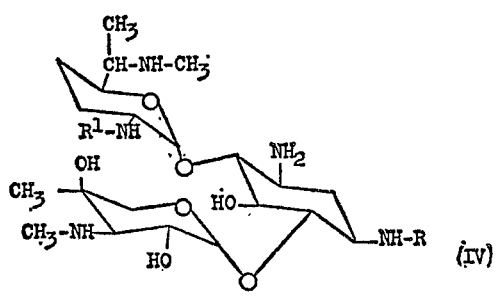

in which either R or R¹ is L-(—)-γ-amino-α-hydroxybutyryl or L-(—)-γ-benzyloxycarbonylamino-α-hydroxybutyryl and the other is hydrogen; or a nontoxic pharmaceutically acceptable acid addition salt thereof.

Another preferred embodiment is the compound of Formula IV wherein either R or R¹ is L-(—)-γ-benzyloxycarbonylamino-α-hydroxybutyryl and the other is hydrogen.

A further preferred embodiment is the compound of Formula IV wherein either R or R¹ is L-(—)-γ-amino-α-hydroxybutyryl and the other is hydrogen.

A most preferred embodiment is the compound of Formula IV wherein R is L-(—)-γ-amino-α-hydroxybutyryl and R¹ is hydrogen; or the mono or disulfate salt thereof.

Another most preferred embodiment is the compound of Formula IV wherein R¹ is L-(—)-γ-amino-α-hydroxybutyryl and R is hydrogen; or the mono or disulfate salt thereof.

The objectives of the present invention have been achieved, by the provision according to the present invention of the process for the preparation of the compound having the formula

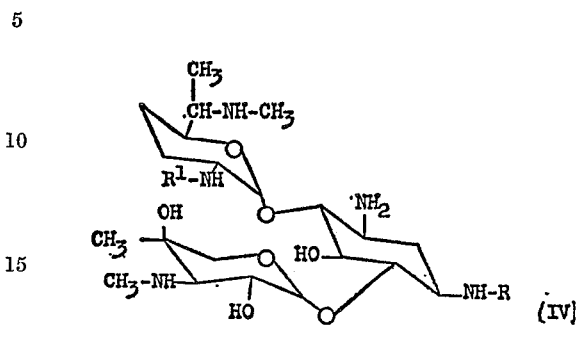

in which either R or R¹ is L-(—)-γ-amino-α-hydroxybutyryl and the other is hydrogen; or a nontoxic pharmaceutically acceptable acid addition salt thereof; which process comprises the consecutive steps of (A) Acylating gentamicin $C_1$ with an acylating agent having the formula

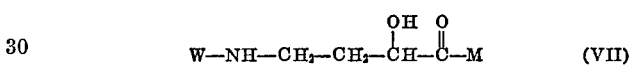

in which W is a radical selected from the group comprising

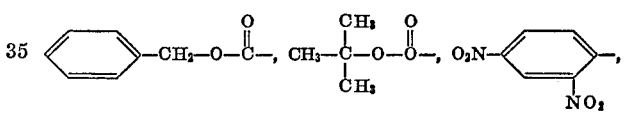

but preferably

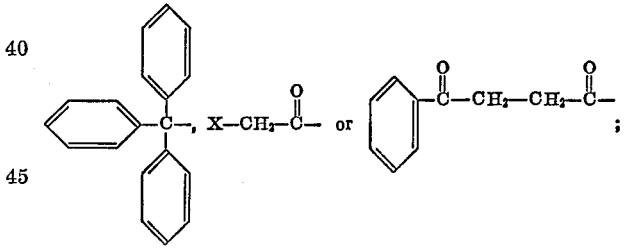

M is a radical selected from the group comprising

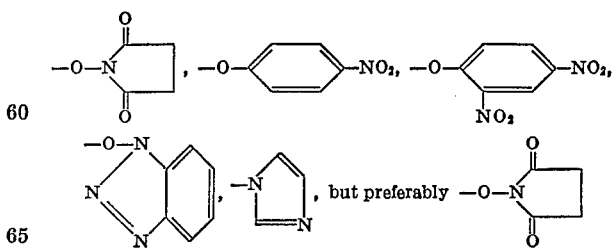

in a ratio of at least 0.5 mole of compound VII per mole of compound I, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-ethylene glycol dimethyl ether, to produce a compound of the formula

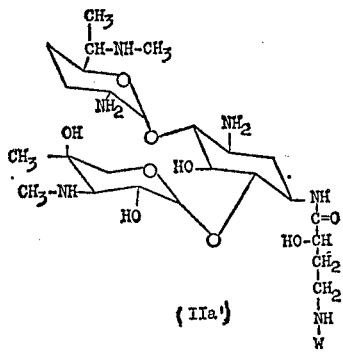

(IIa')

and/or

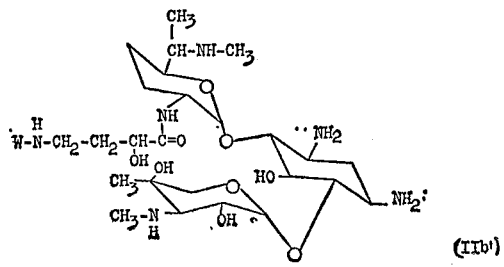

(IIb')

in which W is as above; and (B) Removing the blocking group W from the compounds IIa' and IIb' by methods commonly known in the art, and preferably when W is a radical of the formula

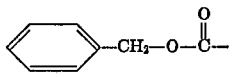

by hydrogenating the compounds II with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-dioxane, and preferably in the presence of a catalytic amount of glacial acetic acid to produce the compounds of Formula IV.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the gentamicin $C_1$ derivative after first reacting said free acid with N,N'-dimethylchloroforminium chloride [cf. Great Britain 1,008,170 and Novak and Weichet, Experientia XXI/6, 360 (1965)] or of alkynylamine reagent [cf. R. Buijile and H. G. Viehe, Angew, Chem., International Edition 3, 582 (1964)], or of a ketenimine reagent [cf. C. L. Stevens and M. E. Munk, J. Amer. Chem. Soc. 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasi-aromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated, but this is not essential. These reactions are well-known in the art (cf. U.S. Pat. Nos. 3,079,314, 3,117,126 and 3,129,224 and British Pat. Nos. 932,644, 957,570 and 959,054).

1-[L-(−)-γ-amino-α-hydroxybutyryl]gentamicin $C_1$ (IIIa, BB-K62) and 2'-[L-(−)-γ-amino-α-hydroxybutyryl]gentamicin $C_1$ (IIIb, BB-K60) both possess excellent antibacterial activity that appears superior in some respects to gentamicin $C_1$ against certain organisms.

Illustrated below are two tables showing the minimal inhibitory concentrations (MIC's) of gentamicin $C_1$ and Compounds IIIa and IIIb against a variety of gram-positive and gram-negative bacteria as obtained by the Steers agar-dilution method (Table I) using Nutrient Agar Medium.

TABLE 1

In Vitro Antimicrobial Activity of Gentamicin $C^1$ Derivatives

| Strain | Bristol No. | BB-K60 | BB-K62 | Gent. $C_1$ |
|---|---|---|---|---|
| E. coli, NIHJ | | 1.6 | 0.8 | 0.2 |
| E. coli, Juhl | A15119 | 1.6 | 1.6 | 0.4 |
| E. coli | A15169 | 1.6 | 1.6 | 0.4 |
| E. coli, KM-R [1] | A20363 | 1.6 | 1.6 | 0.2 |
| E. coli | A9844 | 0.8 | 0.4 | 0.2 |
| E. coli, KM-R [1] | A20365 | 0.4 | 0.8 | 0.1 |
| E. coli, K-12 | | 1.6 | 1.6 | 0.2 |
| E. coli, K-12, KM-R [1] | A20664 | 1.6 | 1.6 | 0.2 |
| E. coli, K-12, KM-R [1] | A20665 | 0.8 | 0.8 | 0.1 |
| E. coli, W677 | A20684 | 0.4 | 0.8 | 0.1 |
| E. coli, JR/W677 | A20683 | 25 | 1.6 | 12.6 |
| K. pneumoniae, D-11 | | 0.4 | 0.4 | 0.2 |
| K. pneumoniae, Type 22, No. 3038 | A20680 | 25 | 1.6 | 25 |
| S. marcescens | A20019 | 1.6 | 1.6 | 0.4 |
| P. aeruginosa, D-15 | | 100 | 100 | 3.1 |
| P. aeruginosa, H9, D-113, KM-R [1] | | >100 | >100 | 12.5 |
| P. aeruginosa | A9923 | >100 | >100 | 12.5 |
| P. aeruginosa | A9930 | 1.6 | 3.1 | 0.2 |
| P. aeruginosa | A15150 | >100 | >100 | 12.5 |
| P. aeruginosa | A15194 | >100 | >100 | 12.5 |
| P. aeruginosa, GM-R [2] | A20717 | >100 | >100 | 100 |
| P. aeruginosa, GM-R [2] | A20718 | >100 | >10000 | >100 |
| P. aeruginosa, H6, D-114 | | | | |
| P. vulgaris | A9436 | 0.8 | 1.6 | 0.2 |
| P. vulgaris | A9526 | 0.8 | 1.6 | 0.2 |
| P. mirabilis | A9554 | 3.1 | 6.3 | 0.8 |
| P. mirabilis | A9900 | 1.6 | 3.1 | 0.4 |
| P. morganii | A9553 | 1.6 | 3.1 | 0.4 |
| P. morganii | A20031 | 1.6 | 3.1 | 0.8 |
| S. aureus, Smith | | 0.4 | 0.8 | 0.1 |
| S. aureus, 209P SM-R [3] | | 6.3 | 3.1 | 0.8 |
| S. aureus, KM-R [1] | A20239 | 1.6 | 1.6 | 0.4 |
| B. subtilis | A9506 | | | |
| Mycobacterium 607 | | 6.3 | 3.1 | 1.6 |
| Mycobacterium 607, KM-R [1] | | >100 | >100 | >100 |
| Mycobacterium 607, KM-R, SM-R [3] | | >100 | >100 | >100 |
| Mycobacterium phlei | | 1.6 | 3.1 | 1.6 |
| Mycobacterium ranae | | 3.1 | 3.1 | 0.8 |

[1] KM-R is kanamycin resistant.
[2] GM-R is gentamicin resistant.
[3] Sm-R is streptomycin resistant.

Compound IIIa, BB-K62, the major acylation product, showed much higher activity than gentamicin $C_1$ against the two gentamicin-resistant organisms (E. coli A20683 and *K. pneumoniae* A20680) which are known to inactivate gentamicin C by 2"-adenylation. However, BB–K62 was about ¼–⅛ as active as gentamicin $C_1$ against the gentamicin-sensitive organisms, and the gentamicin-resistant strains of Pseudomonus were not inhibited by BB–K62.

Compound IIIb, BB–K60, which was the other major product in the reaction, showed similar antibacterial activities to those of BB–K62 except for the lack of activity against the gentamicin-resistant strains of *E. coli* and *K. pneumoniae*.

Both of the major acylation derivatives showed relatively decreased activity against Pseudomonas species as compared with gentamicin $C_2$. They were also inactive against the gentamicin-resistant strains of Pseudomonas.

The Compounds IIIa and IIIb are valuable as antibacterial agents, nutritional supplements in animal feeds, therapeutic agents in poultry and animals, including man, and are especially valuable in the treatment of infectious diseases caused by gram-positive and gram-negative bacteria.

The Compounds IIIa and IIIb are useful as an adjunctive treatment for preoperative sterilization of the bowel when administered orally. Both aerobic and anaerobic flora which are susceptible to these drugs are reduced in the large intestine. When accompanied by adequate mechanical cleansing, they are useful in preparing for colonic surgery.

The Compounds IIIa and IIIb are effective in the treatment of systemic bacterial infections when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

Gentamicin C is a complex of at least three major components differing only in the $R^3$ substituent found on the 5' position of the dideoxy-sugar moiety of the gentamicin nucleus as shown below:

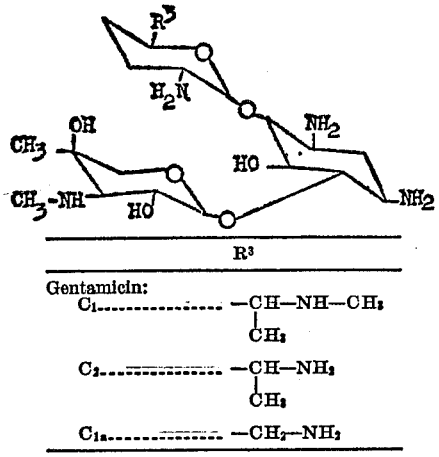

Gentamicin:
$C_1$............ —CH—NH—CH$_3$
                    |
                    CH$_3$ $C_2$............ —CH—NH$_2$
                    |
                    CH$_3$ $C_{1a}$............ —CH$_2$—NH$_2$ Gentamicin $C_1$ was obtained from the complex by the following procedure.

Separation of gentamicin C complex

Gentamicin C complex (4.10 g.) as the free base was fractionated using a preparative counter current distribution (CCD) apparatus (100 ml. x 50 tubes) with a solvent system of CHCl$_3$—MeOH— 17% aqueous NH$_4$OH (2:1:1) to give the fractions shown below.

| Fraction | Tube No. | Amount recovered, g. | Identification (TLC[1]) |
|---|---|---|---|
| I | 25–33 | 1.46 | $C_1$ main. |
| II | 32–42 | 0.72 | $C_1 > C_2$ |
| III | 43–47 | 1.20 | $C_2 + C_{1a}$ |
| IV | 48–50 | 0.87 | $C_{1a}$ main. |

[1] Cellulose thin-layer plate, solvent system: lower layer of CHCl$_3$—MeOH—17% NH$_4$OH (2:1:1), $R_f$: gentamicin $C_1$ (0.69), $C_2$ (0.39), $C_{1a}$ (0.23).

Fractions I and II were combined and distributed again by the same CCD system as above to give 1.94 g. of the gentamicin $C_1$ component which was further purified by a Dowex 1 x 2 column chromatography yielding 1.70 g. of substantially pure gentamicin $C_1$. Other fractions were purified similarly by CCD and Dowex 1 x 2 chromatography to give 1.13 g. of gentamicin $C_2$ and 0.62 g. of gentamicin $C_{1a}$.

EXAMPLES

Example 1.—Preparation of L-(−)-γ-benzyloxycarbonylamino-α-hydroxybutyric acid (VI)

L-(−)-γ-amino-α-hydroxybutyric acid (7.4 g., 0.062 mole) was added to a solution of 5.2 g. (0.13 mole) of sodium hydroxide in 50 ml. of water. To the stirred solution was added dropwise at 0–5° C. over a period of 0.5 hour, 11.7 g. (0.068 mole) of carbobenzoxy chloride and the mixture was continued to stir for one hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5–79.5° C., $[\alpha]_D = 4.5$ (c.=2, CH$_3$OH). Infrared (IR) [KBr]: IR(KBr) $\gamma_{C=O}$ 1740, 1690 cm.$^{-1}$. Nuclear Magnetic Resonance (NMR) (acetone-d$_6$) δ (in p.p.m. from TMS) 2.0 (2H, m.), 3.29 (2H, d-d, J=6.7 and 12 Hz.), 4.16 (1H, d-d, J=4.5 and 8 Hz.), 4.99 (2H, s.), 6.2 (2H, broad), 7.21 (5H, s.).

Analysis.—Calc'd for $C_{12}H_{15}NO_5$ (percent): C, 56.91; H, 5.97; N, 5.53. Found (percent): C, 56.66; H, 5.97; N, 5.47.

Example 2.—N-hydroxysuccinimide ester of L-(−)-γ-benzyloxycarbonylamino-α-hydroxybutyric acid (VII)

A solution of 10.6 g. (0.042 mole) of VI and 4.8 g. (0.042 mole) of N-hydroxysuccinimide[1] in 200 ml. of ethyl acetate was cooled to 0° C. and then 8.6 g. (0.042 mole) of dicyclohexylcarbodiimide was added. The mixture was kept overnight in a refrigerator. The dicyclohexylurea which separated was filtered off and the filtrate was concentrated to about 50 ml. under reduced pressure to give colorless crystals of VII which were collected by filtration; 6.4 g., M.P. 121–122.5° C. The filtrate was evaporated to dryness in vacuo and the crystalline residue was washed with 20 ml. of a benzene-n-hexane mixture to give an additional amount of VII. The total yield was 13.4 g. (92%). $[\alpha]_D 1.5°$ (c.=2, CHCl$_3$) IR (KBr) $\gamma_{C=O}$ 1810, 1755, 1740, 1680 cm.$^{-1}$. NMR (acetone-d$_6$) δ (in p.p.m. from TMS) 2.0, (2H, m.), 2.83 (2H, s.), 3.37 (2H, d-d, J=6.5 and 12.5 Hz.), 4.56 (1H, m.), 4.99 (2H, s.), 6.3 (2H, broad), 7.23 (5H, s.).

Analysis.—Calc'd for $C_{16}H_{18}N_2O_7$ (percent): C, 54.85; H, 5.18; N, 8.00. Found (percent): C, 54.79; 54.70; H, 5.21, 5.20; N, 8.14, 8.12.

Example 3.—Preparation of 1-[L-(−)-γ-benzyloxycarbonylamino - α - hydroxybutyryl]gentamicin $C_1$ (IIa) and 2' - [L-(−)-γ-benzyloxycarbonylamino - α - hydroxybutyryl]gentamicin $C_1$ (IIb)

To a stirred solution of 1.10 g. (2.2 mmoles) of gentamicin $C_1$ in 50 ml. of 50% THF (tetrahydrofuran) and water solution was added 770 mg. (2.2 mmoles) of N - hydroxysuccinimide ester of L-(−) - γ - benzyloxycarbonylamino - α - hydroxybutyric acid at 5° C. The mixture was continued to stir for 20 hours at the same temperature and concentrated in vacuo to dryness. The product thus obtained was separated into two fractions by distribution between 30 ml. of n-butanol and 30 ml.

[1] G. W. Anderson et al., J. Am. Chem. Soc., 86, 1839 (1964).

of water. The n-butanol layer which contained acylated gentamicin $C_1$ was concentrated in vacuo to give 697 mg. of white solid determined to be primarily a mixture of compounds IIa and IIb. A mixture of intact gentamicin $C_1$ and N-hydroxysuccimide (1.052 g.) was recovered from the aqueous layer.

Example 4.—Preparation of 1-[L-(—) - γ - amino-α-hydroxybutyryl]gentamicin $C_1$ (IIIa) and 2′-[L-(—)-γ-amino-α-hydroxybutyryl]gentamicin $C_1$ (IIIb)

The acylated crude mixture of IIa and IIb obtained in Example 3 above (680 mg.) was dissolved in 30 ml. of 50% ethanol and hydrogenated under atmospheric pressure in the presence of 500 mg. of 10% palladium on charcoal overnight at room temperature. The mixture was filtered and the clear filtrate was concentrated in vacuo. The concentrate was loaded on a resin column of Amberlite CG–50 ($NH_4^+$, 60 ml.). The column was washed with water and eluted successively with 200 ml. of 0.1 N ammonia, 720 ml. of 0.5 N ammonia and finally 150 ml. of 1 N ammonia solution. The elutates were combined on the basis of bio-assay (*B. subtilis*) and TLC (silica gel, $CHCl_3$-MeOH-28% $NH_4OH$-$H_2O$, 1:4:2:1) results. The combined fractions were concentrated in vacuo and lyophylized to give the following three products:

30.1 g. (56%) of a diastereomer of the dehydroabiethylamine salt. M.P. 93–94° C. $[\alpha]_D^{24}$ +15° (c. 2.5, MeOH). Recrystallization from 300 ml. of ethanol gave 23.2 g. (43%) of the pure product. M.P. 94–95° C. $[\alpha]_D^{24}$ +10.8° (c. 2.5, MeOH). Further recrystallization did not change the melting point and the specific rotation.

*Analysis.*—Calc'd for $C_{32}H_{42}N_2O_5 \cdot H_2O$ (percent): C, 69.54; H, 8.02; N, 5.07. Found (percent): C, 69.58; H, 8.08; N, 5.07.

(B) L-(—)-γ-amino-α-hydroxybutyric acid: To a solution of 1.5 g. (0.014 mole) of sodium carbonate in 40 ml. of water were added 5.3 g. (0.01 mole) of dehydroabietylammonium L-α-hydroxy - γ - phthalimidobutyrate and 60 ml. of ether. The mixture was shaken vigorously until all of the solid had dissolved. The ether layer was separated. The aqueous solution was washed twice with 20-ml. portions of ether and evaporated to 15 ml. under reduced pressure. To the concentrate was added 10 ml. of concentrated hydrochloric acid and the mixture was refluxed for ten hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small

| | Fraction No. | Amount. mg. | M.P., ° C. (dec.) | $\gamma_{c=o}$ (KBr) | $R_f^1$ |
|---|---|---|---|---|---|
| BB–K60 | 126–140 | 105 | 159–160 | 1,640 cm,$^{-1}$ | 0.71 |
| BB–K61 | 221–250 | 47 | 168–171 | 1,630 cm,$^{-1}$ | 0.50 |
| BB–K62 | 305–316 | 133 | 153–155 | 1,640 cm,$^{-1}$ | 0.41 |
| Gentamicin $C_1$ (control) | | | | | 0.81 |

[1] TLC=Silica gel plate. $CHCl_3$-MeOH-28% $NH_4OH$-$H_2O$ (1:4:2:1).

*Analysis.*—Calc'd for $C_{25}H_{50}O_9N_6 \cdot 3/2 H_2CO_3$ (percent): C, 47.38; H, 7.95; N, 12.51. Found for BB–K60 (percent): C, 47.14; H, 7.39; N, 11.86. Found for BB–K62 (percent): C, 47.02; H, 7.38; N, 12.18.

The identity of BB–K61 was not established although it is known to be a monoacylated-gentamicin $C_1$ derivative with the L-(—)-γ-amino-α-hydroxybutyryl moiety on one of the amine functions other than the 1 or 2′ positions. The compound has low antibacterial activity as compared to compounds IIIa or IIIb.

Example 5.—Preparation of L-(—)-γ-amino-α-hydroxybutyric acid from ambutyrosin A or B or mixtures thereof Ambutyrosin A (5.0 gm.) (U.S. Pat. No. 3,541,078, issued Nov. 17, 1970) was refluxed with 160 ml. of 0.5 N sodium hydroxide for one hour. The hydrolysate was neutralized with 6 N HCl and chromatographed on a column of CG–50 ($NH_4^+$ type). The desired L-(—)-γ-amino-α-hydroxybutyric acid was isolated by developing the column with water and removing the water by freeze drying. The L-(—)-γ-amino-α-hydroxybutyric acid is characterized as a crystalline material having a M.P. of 212.5–214.5° C. (column 2, lines 31–38, U.S. Pat. No. 3,541,078).

Example 6.—Preparation of L-(—)-γ-amino-α-hydroxybutyric acid from DL-α-hydroxy-γ-phthalimidobutyric acid (A) Dehydroabiethylammonium L - α - hydroxy-γ-phthalimidobutyrate: To a solution of 25 g. (0.1 mole) of 2-hydroxy-γ-phthalimidobutyric acid [2] in 200 ml. of ethanol was added a solution of 29 g. (0.1 mole) of dehydroabietylamine in 130 ml. of ethanol. The solution was shaken vigorously for a minute and stood at room temperature for five hours during which time fine needles crystallized out. The crystals were collected by filtration, washed with 50 ml. of ethanol and air dried to obtain

[2] Y. Saito et al., *Tetrahedron Letters*, 1970, 4863.

amount of insoluble phthalic acid. The filtrate was adsorbed on a column of IR–120 ($H^+$, 1 cm. x 35 cm.), the column was washed with 300 ml. of water and eluted with 1 N ammonium hydroxide solution. The eluate was collected in 15-ml. fraction. The ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(—)-γ-amino-α-hydroxybutyric acid M.P. 206–207° C. $[\alpha]_D^{24}$ −29° (c. 2.5, $H_2O$). The IR spectrum was identical with the authentic sample which was obtained from ambutyrosin.

Example 7.—Preparation of the monosulfate salt of 1-[L-(—)-γ-amino-α-hydroxybutyryl]gentamicin $C_1$ or 2′-[L-(—)-γ-amino-α-hydroxybutyryl]gentamicin $C_1$ One mole of 1-[L-(—)-γ-amino-α-hydroxybutyryl]gentamicin $C_1$ (IIIa) or 2′-[L-(—)-γ-amino-α-hydroxybutyryl]gentamicin $C_1$ (IIIb) is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate.

Example 8.—Preparation of the disulfate salt of 1 or 2′-[L-(—)-γ-amino-α-hydroxybutyryl]gentamicin $C_1$ One mole of either 1-[L-(—)-γ-amino-α-hydroxybutyryl]gentamicin $C_1$ or 2′-[L-(—)-γ-amino-α-hydroxybutyryl]gentamicin $C_1$ is dissolved in 1 to 3 liters of water. The solution is filtered to remove any undissolved solids. To the chilled and stirred solution is added 2 moles of sulfuric acid dissolved in 100 ml. of water. The mixture is allowed to stir for 30 minutes, following which cold ethanol is added to the mixture until precipitation occurs. The solids are collected by filtration and are determined to be the desired disulfate salt.

We claim:
1. A compound having the formula

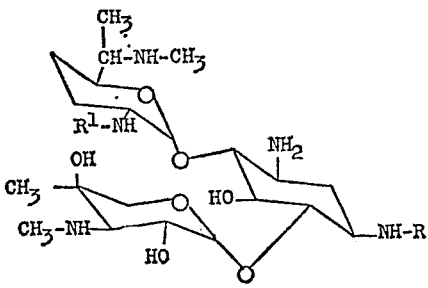

in which either R or $R^1$ is L-(—)-γ-amino-α-hydroxybutyryl or L-(—)-γ-benzyloxycarbonylamino-α-hydroxybutyryl and the other is hydrogen; or a nontoxic pharmaceutically acceptable acid addition salt thereof.

2. The compound of claim 1 wherein either R or $R^1$ is L-(—)-γ-benzyloxycarbonylamino-α-hydroxybutyryl and the other is hydrogen.

3. The compound of claim 1 wherein either R or $R^1$ is L-(—)-γ-amino-α-hydroxybutyryl and the other is hydrogen.

4. The compound of claim 1 wherein $R^1$ is H and R is L-(—)-γ-amino-α-hydroxybutyryl; or a nontoxic pharmaceutically acceptable acid addition salt thereof.

5. The compound of claim 1 wherein R is H and $R^1$ is L-(—)-γ-amino-α-hydroxybutyryl; or a nontoxic pharmaceutically acceptable acid addition salt thereof.

6. The monosulfate salt of the compound of claim 4.
7. The monosulfate salt of the compound of claim 5.
8. The disulfate salt of the compound of claim 4.
9. The disulfate salt of the compound of claim 5.
10. The mono or polyhydrates of the compound of claim 3.
11. The mono or polyhydrates of the compound of claim 4.
12. The mono or polyhydrates of the compounds of claim 6.
13. The mono or polyhydrates of the compounds of claim 8.

References Cited
UNITED STATES PATENTS 3,541,078  11/1970  Woo et al. _____ 260—210 R
3,651,042  3/1972  Marques et al. ___ 260—210 AB JOHNNIE R. BROWN, Primary Examiner U.S. Cl. X.R.

99—2; 260—210 R; 424—181